Jan. 28, 1964 N. J. METZ 3,119,938
BISTABLE TRIGGER CIRCUIT
Filed Jan. 5, 1962
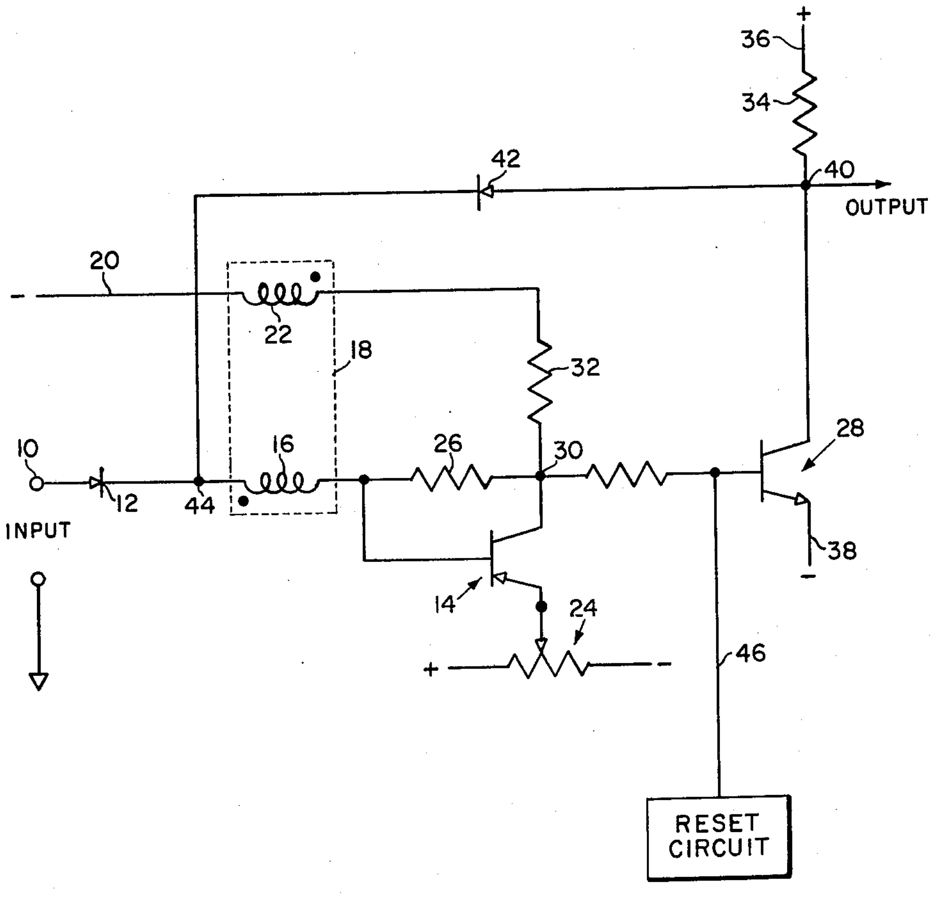
INVENTOR.
NORMAN J. METZ
BY Ervin F. Johnston
George J. Rubens
ATTORNEYS United States Patent Office 3,119,938

Patented Jan. 28, 1964

3,119,938
BISTABLE TRIGGER CIRCUIT

Norman J. Metz, Honolulu, Hawaii, assignor, by mesne assignments, to the United States of America as represented by the Secretary of the Navy Filed Jan. 5, 1962, Ser. No. 164,635
11 Claims. (Cl. 307—88.5)

The present invention relates to a bistable trigger circuit and more particularly to a trigger circuit which has means for immediately cutting off a trigger pulse so as to improve voltage sensitivity and prevent multiple output pulses when the trigger pulse is of a relatively low slope.

The bistable trigger circuit or voltage comparator is one of the most important circuits used in analogue-to-digital converters in that this circuit indicates the exact time that an input waveform or trigger pulse passes through a predetermined reference level. Bistable circuits employing vacuum tubes rather than transistors have not been adequate for use in analogue to digital converters in that the maximum accuracy of such a circuit has been limited to about plus or minus 100 millivolts. This limitation in accuracy has been due to contact potential, heater voltage and transconductance of the vacuum tubes. In contrast, present bistable circuits employing transistors can be designed to have an accuracy of plus or minus 5 millivolts throughout a temperature range of 20° C. to 40° C. Upon receiving a trigger pulse these transistorized circuits have been designed to provide regenerative feed back to a transistor within the circuit so as to cut off this transistor rapidly and generate a sharp output pulse. While this transistor is cut off, the circuit is unstable and the problem has been to prevent the circuit from generating more than one output pulse during this time. Presently, the natural period of the circuit has been carefully chosen; however, regardless of the chosen period the trigger pulse must have no greater than a specified minimum slope when passing through the reference level in order to prevent the circuit from misfiring. Further, because of capability demands upon computers it is required that the circuit have even a greater voltage sensitivity than that mentioned last above. The present invention has overcome these problems by providing a circuit which has improved voltage sensitivity and which will never misfire after a signal is introduced into the input regardless of the slope of trigger pulse as it passes through the reference level. This is accomplished by a feedback loop to the input of the circuit, this loop having components for backbiasing the input after a trigger pulse has been applied thereto.

An object of the present invention is to provide a bistable trigger circuit which is not limited in its operation by a specified minimum slope of an input trigger pulse as it passes through the reference voltage.

Another object is to provide a means for removing an input trigger pulse to a bistable trigger circuit immediately upon the pulse reaching a predetermined level so as to allow a highly accurate adjustment for voltage sensitivity of the circuit, regardless of the magnitude of the input impedance.

A further object is to provide a bistable trigger circuit which will obviate multiple output pulses after the introduction of a trigger pulse.

Still another object is to provide a bistable trigger circuit which has greater voltage sensitivity.

A still further object is to provide a bistable trigger circuit which has greater voltage sensitivity and which is not limited by a minimum specified slope of the trigger pulse.

Other objects and many of the attendant advantages of this invention will be readily appreciated as the same becomes better understood by reference to the following detailed description when considered in connection with the accompanying drawing which illustrates a schematic circuit diagram of the preferred embodiment of the present invention.

Referring now to the drawing there is shown an input terminal 10 connected via a diode 12 to the base of a PNP type transistor 14, the diode 12 having its forward resistance towards the base. Connected between the base of the transistor 14 and the diode 12 is a secondary 16 of a transformer 18 and connected between the collector of the transistor 14 and a lead 20 under a negative potential is a primary 22 of the transformer 18, the primary and the secondary being poled opposite to one another as shown in the drawing. The emitter of the transistor 14 is connected to a reference level adjustment circuit 24. The collector of the transistor 14 is connected via a resistor 26 to the base of the transistor so as to reverse-bias the collector-base junction of the transistor 14. A NPN transistor 28 has a base connected to a point 30 between the collector of the transistor 14 and the primary 22. Between the point 30 and the primary 22 is a resistor 32.

During the quiescent state of the circuit the collector-base junction of the transistor 28 is reverse-biased via a resistor 34 by a positive potential source applied to a lead 36 and the emitter-base junction thereof is forward-biased by a negative potential source applied to a lead 38. A point 40 between the resistor 34 and the collector of the transistor 28 is connected via a diode 42 to a point 44 between the input diode 12 and the secondary 16, the diodes 42 and 12 having their forward resistances opposing one another. The output of the circuit can be taken off at point 40. A lead 46 is connected from a reset circuit (not shown) to the base of the transistor 28 for restoring the circuit to a quiescent state after a trigger pulse has been introduced.

In describing the operation of the circuit certain voltage polarities described above will be assumed, however, it is to be understood that the invention is not limited to these polarities. The emitter of the transistor 14 is set at a particular reference level which is to forward bias the emitter-base junction during the quiescent state of the circuit so that during this state the transistor 14 is conductive. Since the potential source at lead 20 is negative, the collector-base junction of the transistor 14 will be reverse-biased with the base of the transistor 28 set at the potential of the terminal 10. The emitter-base junction of the transistor 28 is forward-biased so that the transistor 28 will conduct during the quiescent state of the circuit. The potential source at lead 36 is positive-going which after a voltage drop through the resistor 34 is more negative than the input to the diode 12 during the quiescent state of the circuit. Accordingly, during the quiescent state of the circuit the diode 42 is back-biased so as to have no effect on the remainder of the circuit during this time. When the input signal at terminal 10 becomes more positive than the reference voltage on the emitter of the transistor 14 so as to represent a trigger pulse, this transistor will be cut off, thus collapsing the field in the primary 22. The collapse of the field in the primary 22 induces a current into the secondary 16 which is of a reverse polarity to the primary 22 thereby producing regenerative feedback into the base of the transistor 14 causing a quick cut-off thereof. The cut-off of transistor 14 stops the current flow through resistor 32 so as to cause point 30 to become more negative approaching the potential source applied to the lead 20. The more negative potential at point 30 is applied to the base of the transistor 28, this negative potential being greater than that applied to the emitter so as to cut off this transisor. When the transistor 28 is cut off, the current flow through resistor 34 is stopped so that the potential at point 40 becomes more positive approaching that of the potential source applied to the lead 36. The point 40 being of a greater positive potential than the trigger pulse at the terminal 10, the diode 42 is allowed to conduct so as to back-bias the diode 12, thus removing the pulse immediately upon it reaching the level set into the emitter of the transistor 14. The circuit can be reset by applying a positive-going pulse from the lead 46 to the base of the transistor 28. This positive-going pulse allows the transistor 28 to conduct, thereby giving a voltage drop across resistor 34 so as to drop the potential at point 40 below the input at terminal 10 whether this input be the trigger pulse or not. The input at terminal 10 then is free to operate upon the base of the transistor 14 as previously described.

It is to be understood that vacuum tubes can be used in place of the transistors 14 and 28, however, the accuracy of the circuit will be materially reduced thereby. Further, the circuit can be made to operate on either positive or negative slope input waveforms simply by reversing the polarity of the various potential sources mentioned and using an NPN transistor in place of the PNP transistor 14 and a PNP transistor in place of the NPN transistor 28.

It is now readily apparent that the present invention provides a more accurate bistable trigger circuit. By removing the input trigger pulse immediately upon its reaching a reference level the trigger circuit has a high voltage sensitivity, even though the input has a relatively large impedance. Further, by removing the trigger pulse immediately upon its reaching the reference level, multiple output pulses are obviated regardless of the low degree of slope of the trigger pulse.

Obviously many modification and variations of the present invention are possible in the light of the above teachings. It is therefore to be understood that within the scope of the appended claims the invention may be practiced otherwise than as specifically described.

I claim:

1. A bistable circuit operable by a trigger pulse comprising a transistor connected to an input terminal, a diode connected between the transistor and the input terminal, means for biasing the transistor so that the transistor is conducting during a quiescent state of the circuit, means including a resistor for causing regenerative feedback to the transistor so that the transistor will be quickly cut off upon the application of the trigger pulse to the input terminal and means responsive to the condition of the transistor for back biasing the diode after a trigger pulse has been introduced therein whereby the circuit has greater voltage sensitivity and multiple output pulses from the circuit are prevented regardless of the slope of the trigger pulse.

2. A bistable circuit comprising a first transistor having a base, emitter and collector, the base being connected to an input terminal, a first diode connected between the transistor and the input terminal, means for forward biasing the emitter-base junction of the first transistor so that this transistor is conducting during a quiescent state of the circuit, means including a resistor for causing regenerative feedback between the collector of the first transistor and the base thereof so that this transistor will be quickly cut off upon the application of a trigger pulse to the input terminal, and means responsive to the collector voltage of the first transistor for back-biasing the first diode after a trigger pulse has been introduced therein whereby the trigger pulse is quickly cut off so as to provide a greater voltage sensitivity and prevent multiple output pulses from the circuit when the trigger pulse is of a relatively low slope.

3. A circuit as claimed in claim 2 wherein the means for back biasing the first diode includes a second transistor having a base, emitter and collector oppositely poled to the first transistor, means for forward biasing the emitter-base junction of said second transistor, the base of the second transistor being connected to the collector of the first transistor so that when the first transistor is cut off said regenerative feedback terminates to change the potential applied to the base of the second transistor so as to cause it to cut off, a second diode connected from the collector of the second transistor to a point between the first transistor and the first diode, the second diode opposing the first diode, means including a resistor for applying a source of potential to the collector of the second transistor so that when the second transistor is cut off the second diode is forward biased, said source of potential being of the same polarity and greater than the trigger pulse introduced into the input terminal whereby the trigger pulse introduced into the input terminal will cut off both transistors causing the source of potential to pass through the second diode so as to back bias the first and cut off the trigger pulse.

4. A circuit as claimed in claim 3 wherein the first transistor is a PNP type and the second transistor is a NPN type, the base of the NPN transistor being connected to the regenerative feedback, means between the resistor thereof and the collector of the PNP transistor so that upon cut off of the PNP transistor, an emitter-base junction of the NPN transistor will become reversed biased so as to cause conduction through the second diode to back bias the first diode.

5. A circuit as claimed in claim 4 wherein the base of the NPN transistor is connected to a reset circuit capable of introducing a positive signal whereby upon introducing the positive signal into the base of the NPN transistor the entire bistable circuit is readied for receiving the next trigger pulse.

6. A circuit as claimed in claim 5 wherein the bistable circuit has an output between the means for applying the potential source and the collector of the NPN transistor.

7. A bistable circuit comprising a PNP type transistor having a base, emitter and collector, the base of the transistor being connected to an input terminal, a diode connected in series between the input terminal and the transistor with its forward resistance toward the transistor, a transformer having a secondary connected in series between the base and the diode and a primary connected to the collector of the transistor, the primary and secondary of the transformer being oppositely poled so as to cause regenerative feedback between the collector and the base, a resistor connected between the primary and the collector, a negative source of potential applied to the primary so as to reverse bias the collector-base junction, means for biasing the emitter of the transistor more positive than the base so that the transistor will conduct during a quiescent state of the circuit, a feedback line connected from a point between the resistor and the collector to a point between the secondary of the transformer and the diode, a NPN transistor in the feedback line having a base, emitter and collector, the base of the NPN transistor being connected to the point between the resistor and the collector of the PNP transistor, a second diode in the feedback line connected between the collector of the NPN transistor and the point between the first diode and the secondary with the forward resistance of the second diode toward the latter point, means having a resistor for applying a positive potential source between the collector of the NPN transistor and the second diode so as to reverse bias the collector-base junction of the NPN transistor during the quiescent state of the circuit and means for forward biasing the emitter-base junction of the NPN transistor so that during the quiescent state of the circuit this transistor is conducting whereby upon a sufficiently positive trigger pulse being applied to the input terminal the PNP transistor will be quickly cut off by the positive pulse applied to the base thereof in conjunction with regenerative feedback through the transformer to its base, and the NPN transistor will be quickly cut off by the more negative potential applied to its base from the point between the resistor and the collector of the PNP transistor, the cut off of the NPN transistor in conjunction with the resistor of the positive potential source means causing a more positive potential to be applied to the second diode so as to back bias the first diode and the PNP transistor, thus allowing a very accurate adjustment of the circuit for voltage sensitivity and preventing multiple output pulses regardless of the low degree of slope of the trigger pulse.

8. In a bistable circuit operable by a trigger pulse and having an input diode to which said trigger pulse is applied, a transistor having at least base and collector electrodes, and an inductor connected between said diode and the base electrode of said transistor; the improvement comprising means connected to the collector electrode of said transistor responsive to a condition of the transistor for back biasing the input diode when the trigger pulse is introduced into the latter, whereby the trigger pulse is quickly cut off so as to provide greater voltage sensitivity and prevent multiple output pulses from the circuit caused by the trigger pulse being of a relatively low slope.

9. In a bistable circuit having an input diode, an inductor, and a transistor having base, emitter and collector electrodes, said inductor being connected in series between said input diode and the base electrode of said transistor, the latter being conductive when the circuit is in a quiescent state and a substantially constant potential source connected to said transistor; the improvement comprising a resistor connected between said potential source and the collector electrode of said transistor and means responsive to a change in voltage across said resistor when the transistor is cut off for back biasing the input diode when a trigger pulse is introduced into the latter whereby the trigger pulse is cut off so as to provide a greater voltage sensitivity and prevent multiple output pulses from the circuit when the trigger pulse is of a relatively low slope.

10. The improvement as claimed in claim 9 wherein the back biasing means includes a second transistor, means for forward biasing the emitter-base junction of the second transistor, said second transistor having a base connected to a point between the resistor and the first mentioned transistor so that a change in conduction of the first transistor will control the second transistor, a diode, a feed-back circuit including a further diode and means for connecting said further diode between the second transistor and the input diode with the forward resistance of the further diode opposing the input diode, a second potential source of the same polarity and of greater potential than the trigger pulse connected to a point between the said further diode and the second transistor so that the second transistor will control the amount of current flow from said second potential source, a second resistor connected between the second potential source and the last mentioned point for governing the voltage applied to the said further diode whereby upon a trigger pulse being introduced at the input diode the change in potential at the point between the said further diode and the second transistor will be applied through the said further diode for back biasing the input diode.

11. The improvement as claimed in claim 10 wherein the first transistor is of the PNP type and the second transistor is of the NPN type.

References Cited in the file of this patent

UNITED STATES PATENTS 2,758,206 Hamilton -------------- Aug. 7, 1956

OTHER REFERENCES

IBM Technical Disclosure Bulletin, vol. 2, No. 6, April 1960, Single Junction Type Transistor Trigger and Indictator, page 87.